US007752321B1

(12) United States Patent
Pfeffer

(10) Patent No.: US 7,752,321 B1
(45) Date of Patent: Jul. 6, 2010

(54) VALIDATING USER EXPERIENCE TYPE SETTINGS

(75) Inventor: Howard L. Pfeffer, Reston, VA (US)

(73) Assignee: AOL Inc., Dulles, VA (US)

( * ) Notice: Subject to any disclaimer, the term of this patent is extended or adjusted under 35 U.S.C. 154(b) by 1954 days.

(21) Appl. No.: 10/746,931

(22) Filed: Dec. 29, 2003

(51) Int. Cl.
*G06F 15/16* (2006.01)

(52) U.S. Cl. ........................ 709/229; 709/217; 709/218; 709/219; 709/220; 709/225

(58) Field of Classification Search ......... 709/217–219, 709/220, 225, 229
See application file for complete search history.

(56) References Cited

U.S. PATENT DOCUMENTS

| | | | | |
|---|---|---|---|---|
| 5,706,507 | A | 1/1998 | Schloss | |
| 5,764,739 | A | 6/1998 | Patton et al. | |
| 5,831,971 | A | 11/1998 | Bonomi et al. | |
| 5,907,831 | A | 5/1999 | Lotvin et al. | |
| 5,918,019 | A | 6/1999 | Valencia | |
| 5,961,620 | A | 10/1999 | Trent et al. | |
| 5,987,611 | A | 11/1999 | Freund | |
| 6,006,212 | A | 12/1999 | Schleich et al. | |
| 6,119,165 | A | 9/2000 | Li et al. | |
| 6,219,655 | B1 | 4/2001 | Schleich et al. | |
| 6,240,091 | B1 | 5/2001 | Ginzboorg et al. | |
| 6,240,167 | B1 | 5/2001 | Michaels | |
| 6,337,899 | B1 | 1/2002 | Alcendor et al. | |
| 6,519,461 | B1 | 2/2003 | Andersson et al. | |
| 6,757,456 | B2 | 6/2004 | McDonald et al. | |
| 2001/0044835 | A1 | 11/2001 | Schoeber et al. | |
| 2002/0083179 | A1 * | 6/2002 | Shaw et al. | 709/227 |
| 2002/0112048 | A1 * | 8/2002 | Gruyer et al. | 709/224 |
| 2003/0214955 | A1 | 11/2003 | Kim | |
| 2005/0055371 | A1 | 3/2005 | Sunder et al. | |
| 2006/0153214 | A1 * | 7/2006 | Moore et al. | 370/401 |
| 2007/0226344 | A1 * | 9/2007 | Sparrell et al. | 709/226 |
| 2008/0092168 | A1 * | 4/2008 | Logan et al. | 725/44 |
| 2008/0120683 | A1 * | 5/2008 | Frazier et al. | 725/141 |

(Continued)

FOREIGN PATENT DOCUMENTS

| | | |
|---|---|---|
| CA | 2312460 | 2/2001 |

(Continued)

OTHER PUBLICATIONS

Call Hunt; "Call Hunt Keeps the Conversations", www.vonage.com/features_call_hunt.php; 1 page; (2004).

(Continued)

*Primary Examiner*—Nathan Flynn
*Assistant Examiner*—Mohamed Wasel
(74) *Attorney, Agent, or Firm*—Fish & Richardson P.C.

(57) ABSTRACT

A home gateway accesses a host system that differentially routes messages over a communication network to a destination system. The selection of a communication pathway from multiple possible communication pathways through a communication network is based on a user experience type (e.g., gaming user experience, streaming user experience, or browsing user experience) that generally reflects network resource consumption preferences of the user of the access account for the home gateway. Examples of user experience types include a gaming user experience, a streaming user experience and a browsing user experience. The user experience type generally reflects the online experience desired by the user.

9 Claims, 7 Drawing Sheets

U.S. PATENT DOCUMENTS

2008/0255692 A1 * 10/2008 Hofrichter et al. ............ 700/94

FOREIGN PATENT DOCUMENTS

WO WO 99/19988 4/1999

OTHER PUBLICATIONS

"PPP over Ethernet: A Comparison of Alternatives for PC-to-xDSL Modem Connectivity," Redback Networks, Mar. 1999, pp. 1-8.

Townsley, W., et al., "Layer Two Tunneling Protocol 'L2TP'", The Internet Society, 1999, pp. 1-80.

Evans, Shara, "Standards Watch: Tunnelling Through the Web," Mar. 1999, Telsyte—Telecommunications Strategic Planning.

"Intel Introduces High Speed Wireless Networking Products Designed for the Home and Small Office," M2 Communications Ltd., 2001, pp. 1-3.

"Embedded Web Guru Co-Authors New Security Standard; Digest Authentication Provides Secure Web Login," Business Wire, Jun. 14, 1999, pp. 1-2.

Agranat, Ian, "Authentication Standardizes Web," *Electronic Engineering Times*, No. 1018, p. 78, Jul. 27, 1998.

Prosise, Jeff, "ASP.NET Security: An Introductory Guide to Building and Deploying More Secure Sites with ASP.NET and IIS," *MSDN Magazine*, vol. 17, No. 4, p. 54, Apr. 30, 2002.

* cited by examiner

400

VALIDATING USER EXPERIENCE TYPE SETTINGS

TECHNICAL FIELD

This description relates to communicating between two systems.

BACKGROUND

When two systems communicate with one another, a device or identity associated with one of the systems (e.g., a client system) typically is made known to the other system (e.g., a host system). The user of the client system may pay a fee to be permitted to access the host system. The host system may be, for example, an Internet access provider or an Internet service provider. In many cases, the access fee may be based on the right to access the host system for a period of time, such as a month. Often a small percentage of users may use a high percentage of host system resources, such as the network bandwidth.

SUMMARY

In one general aspect, computer network access to a home network is provided by enabling the determination of a user experience type for a network connection that is between a home-networking device connected to a home network and a destination system. The user experience type is determined from multiple possible experience types and associated with the home-network. The selection of a particular communication pathway through a communication network from multiple possible communication pathways to the destination system is enabled based on the associated user experience type.

Implementations may include one or more of the following features. For example, the destination system may be a network access provider system. The selection of a network access system may be enabled in which the network access system is located between the home-networking device and the destination system.

The selection of the communication pathway may be performed by a network device located between the home network and the destination system. A home-networking device may be used to to determine a user experience type that is applicable for communications using the communication pathway. The determined user experience type for the communications to the network device located between the home network and the destination system may be transmitted. To transmit the determined user experience type, the user experience type may be added to communications transmitted from the home network and the network device.

The specification, by a user, of the user experience type may be enabled. A user may select the user experience type from among a gaming user experience, a streaming user experience and a browsing user experience. The specification of the user experience type may be received from a user. The user experience type may be detected based on communications characteristics.

An account may be associated with the user experience type. The generation of billing information for the account may be enabled based on the user experience type associated with the user account.

The use of network resources by the home-networking device may be monitored. Notification of the network access provider system of network resources used by the home-networking device may be enabled.

The use of network resources by the home network device may be compared with a predetermined threshold of network resource use that is associated with the experience type. The user account may be notified when the use of network resources exceeds the predetermined threshold of network use. The predetermined threshold of network use may be less than a maximum value of network resources use that is associated with the user account.

In another general aspect, user experience type settings are validated by accessing information relating to a locally-stored user experience type settings and receiving comparable information relating to the remotely-stored user experience type settings. The information relating to the locally-stored user experience type settings is compared with the received comparable information relating to remotely-stored user experience type settings. When the information relating to the locally-stored user experience type settings does not match the received comparable information relating to the remotely-stored user experience type settings, the locally-stored the user experience type settings are updated. The locally-stored user experience type settings are applied.

Implementations may include one or more following features. For example, the user experience type settings may include a user experience type from more than one possible user experience types. User experience type settings may include communication information to manage the transfer of data between a home network and a destination system. The communication information may include one or more of an average bandwidth limitation, a traffic burstiness limitation, and a quality of service limitation. The user experience type settings may include a checksum computed for the user experience type settings.

Applying the locally-stored user experience type settings may include selecting a communication pathway through a communication network having multiple nodes based on user experience type settings. User experience type settings may be received from a network access provider system.

In yet another general aspect, information related to a user experience type associated with a user account may be mirrored. A communications session is established between a user device and a network access provider device through a home-networking gateway located between software at the user device that initiates the communications session and the network access provider device. Information relating to user experience type settings applicable to communications in the communications session is determined. The information relating to user experience type settings is mirrored from the network access provider device to the home-networking gateway. The locally-stored user experience type settings are applied to communications in the communications session.

Implementations may include one or more following features. For example, mirroring information relating to user experience type settings may include receiving information relating to user experience type settings from the network access provider device and storing information relating to user experience type settings on the home-networking gateway. Mirroring information relating to user experience type settings also may include accessing information relating to user experience type settings on the network access provider device and sending information relating to user experience type settings to the home-networking gateway.

A message may be received from the home-networking gateway indicating whether the information relating to user experience type settings sent to the home-networking gateway matches information relating to user experience type settings stored on the home-networking gateway.

Implementations of the techniques discussed above may include a method or process, an apparatus or system, or computer software on a computer-accessible medium.

The details of one or more implementations set forth in the accompanying drawings and the description below. Other features will be apparent from the description and drawings, and from the claims.

DETAILED DESCRIPTION

A home gateway accesses a host system that differentially routes messages over a communications pathway of a communications network to a destination system. The selection of a particular communications pathway from multiple possible communication pathways through a communications network is based on a user experience type that generally reflects network resource consumption preferences of the user of the access account for the home gateway. Examples of user experience types include a gaming user experience, a streaming user experience and a browsing user experience. The user experience type generally reflects the online experience desired by the user, but in addition, may reflect the technical or other implementation details of how the level of access is provided. This may be referred to as tiered access account management or tiered access pricing. Tiered access account management may be analogous to the purchase of an airplane ticket based on a general, preferred flying experience (e.g., a first class experience, a business class experience, or a coach class experience). A user experience type may be associated with an access account based on an explicit selection of a particular user experience type by a user. Additionally or alternatively, a user experience type may be associated with an access account based on the detection of communication characteristics that are indicative of a particular user experience type.

Figure 1:
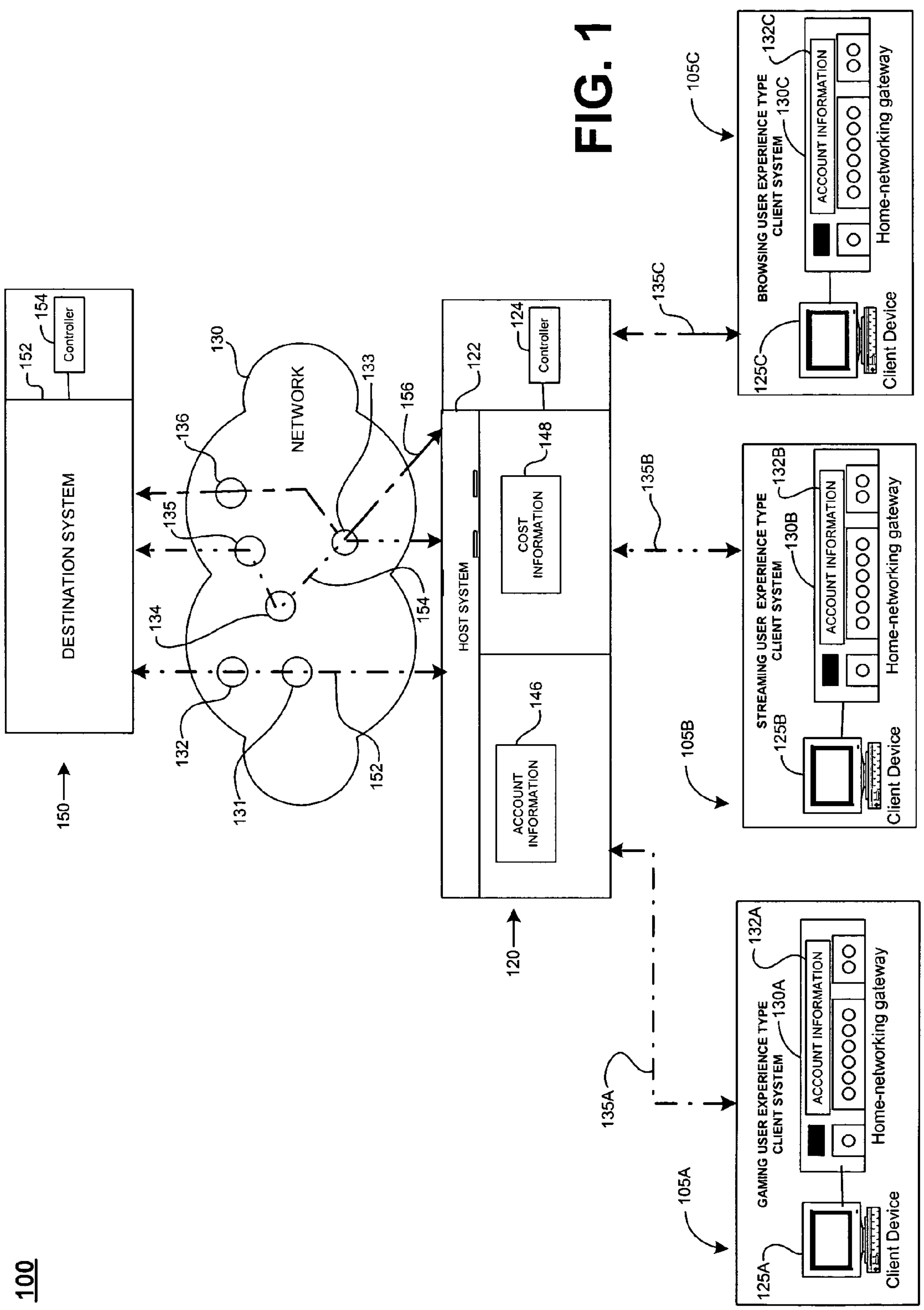
FIG. 1 is a block diagram illustrating an exemplary communications system capable of providing tiered access to a computer network from a home network.

FIG. 1 illustrates a communications system 100 that includes three client systems 105A, 105B, and 105C that communicate with a host system 120. The host system 120, in turn, provides access through a network 130 having multiple network nodes 131-135 to a destination system 150 that provides content and/or functions to the client systems 105A, 105B and 105C. In general, the host system 120 differentially routes messages between each of the client systems 105A, 105B and 105C and the destination system 150 based on the account information associated with each of the client systems 105A, 105B and 105C.

Each of client systems 105A, 105B and 105C includes a client device 125A, 125B or 125C, respectively, and a home-networking gateway 130A, 130B or 130C, respectively. The client device 125A, 125B or 125C typically includes a general purpose computer that has an internal or an external storage for storing data and programs such as an operating system (OS) (e.g., DOS ("Disk Operating System"), Windows®, Windows® 95, Windows® 98, Windows® 2000, Windows® NT, Windows® Millennium Edition, Windows® XP, OS/2, and Linux) and one or more application programs. Examples of application programs include authoring applications (e.g., word processing, database programs, spreadsheet programs, presentation programs, and graphics programs) capable of generating documents or other electronic content; client applications (e.g., AOL client, CompuServe client, AIM client, AOL TV client, and an ISP capable of communicating with other computer users, accessing various computer resources, and viewing, creating, or otherwise manipulating electronic content); and browser applications (e.g., Netscape's Navigator and Microsoft's Internet Explorer) capable of rendering standard Internet content.

The general-purpose computer also includes a central processing unit ("CPU") for executing instructions in response to commands from a client controller. In one implementation, the client controller may include one or more of the application programs installed on the internal or external storage of the general-purpose computer. In another implementation, the client controller may include application programs externally stored in and executed by one or more device(s) external to the general-purpose computer.

The general-purpose computer may include a communications device for sending and receiving data. One example of the communications device is a modem. Other examples include a transceiver, a set-top box, a communications card, a satellite dish, an antenna, or another network adapter capable of transmitting and receiving data over the communications link through a wired or wireless data pathway.

The general-purpose computer also may include a television ("TV") tuner for receiving TV programming in the form of broadcast, satellite, and/or cable TV signals. As a result, the client device can selectively and/or simultaneously display network content received by communications device and TV programming content received by the TV tuner.

The general-purpose computer may include an input/output interface that enables a wired or wireless connection to various peripheral devices. Examples of peripheral devices include, but are not limited to, a mouse, a mobile phone, a personal digital assistant (PDA), a keyboard, a display monitor with or without a touch screen input, and/or a TV remote control for receiving information from and rendering information to subscribers. Other examples may include voice recognition and synthesis devices.

Devices such as a mobile telephone, a PDA, and a TV remote control may be peripheral with respect to the general-purpose computer. In some implementations, such devices may themselves include the functionality of the general-purpose computer and operate as the client device. For example, the mobile phone or the PDA may include computing and networking capabilities, and may function as a client device by accessing a network and communicating with a host system. Furthermore, the client system may include one, some or all of the components and devices described above.

The home-networking gateway, such as home-networking gateway 130A, 130B or 130C, is capable of sending and receiving messages with the host system 120. The home-networking gateway 130A, 130B or 130C may be a communications gateway, a router, or other type of communications device capable of directing and exchanging messages with the host system 120. The home-networking gateway 130A, 130B or 130C may include a firewall or other security techniques to inspect incoming messages and approving or rejecting messages to protect the home-networking gateway 130A, 130B or 130C and client system 105A, 105B or 105C.

The home-networking gateway 130A, 130B or 130C includes account information 132A, 132B or 132C respectively that a user account name or other type of user account identifier, such as the media access control (MAC) address of a home gateway device through which the client system 105A, 105B or 105C accesses the host system 120, the clear-text and/or encrypted password associated with the user account, and a realm string or other type of information, provided by the host system 120, that is used by the home-networking gateway 130A, 130B or 130C to access the host system 120.

The account information 132A, 132B or 132C also includes a user experience type that is associated with the account used by the home-networking gateway 130A, 130B or 130C to access the host system 120. The user experience type generally reflects online experience preference of the owner of the access account used by the home-networking gateway 130A, 130B or 130C to access the host system 120. The user experience type may be one of several types, such as (but not limited to) a browsing user experience type, a streaming user experience type, and a gaming user experience type. The browsing user experience type may generally reflect an online experience preferred by a typical user browsing the Internet. Browsing the Internet may include, for example, periodic connection to the host system 120 for electronic mail access and the downloading of content (such as Web pages) from the Internet to the client system 105A, 105B or 105C. The streaming user experience type may generally reflect an online experience preferred by a typical streaming user, requiring high bandwidth consumption to support the streaming of digital content (such as the streaming of a movie or a song) to the client system 105A, 105B or 105C. The gaming user experience type may generally reflect an online experience preferred by a typical gamer, requiring a very quick online response (e.g., low latency between the sending of a request and the receipt of a response to the request) to support the playing of interactive games online. The account information 132A of client system 105A includes a user experience type of gaming user. The account information 132B of client system 105B includes a user experience type of streaming user. The account information 132C of client system 105C includes a user experience type of browsing user.

The user experience type may be selected by a user of the client device 125A, 125B or 125C, respectively, for a user account for accessing the host system 120. The user experience type selection may be made, for example, as part of a registration process for configuring the home-networking gateway 130A, 130B or 130C or establishing a user account used to access the host system 120. The user experience type may be associated with a particular client system 105A, 105B or 105C, a particular client device 125A, 125B or 125C or a user account associated with a particular identity. The selected user type is associated with the user account and stored in account information 132A, 132B or 132C on the client system 105A, 105B or 105C, respectively, and also is stored on the host system 120, as described below.

The account information 132A, 132B or 132C also may include information related to the consumption of network resources, such as bandwidth, by the home-networking gateway 130A, 130B or 130C. For example, the home-networking gateway 130A, 130B or 130C may store the amount of data transferred between the home-networking gateway 130A, 130B or 130C and the host system 120 during a predetermined period of time.

In some implementations, the home-networking gateway 130A, 130B or 130C may be configured to send the consumption information to the host system 120 for use in marketing additional computer or network access services for the account.

The home-networking gateway 130A, 130B or 130C connects with the host system 120.

The client system 105A, 105B or 105C communicates with the host system 120 through communications pathway 135A, 135B or 135C, irrespective of physical separation. Each of the communication pathways 135A, 135B or 135C may include, for example, a wired, wireless, cable or satellite communications pathway.

In some implementations, the communications pathway 135A, 135B or 135C may include a delivery network (not shown) making a direct or indirect communication between the client system 110A, 110B or 110C and the host system 120. Examples of a delivery network include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line)), radio, television, cable, satellite, and/or any other delivery mechanism for carrying data. The host system 120 includes a host device 122 and a host controller 124. Access to the communications pathway 135A, 135B or 135C may be controlled by the operator of the host system 120, though access to the communications pathway 135A, 135B or 135C need not be so controlled. For example, one Internet access provider (or Internet service provider) may operate the host system 120 while a different Internet access provider may control access to the communications pathway 135A, 135B or 135C. Alternatively, the same Internet access provider may operate the host system 120 and the communications pathways 135A, 135B and 135C.

The host device 122 and the host controller 124 each typically include one or more hardware components and/or software components. An example of a host device 122 is a general-purpose computer capable of responding to and executing instructions in a defined manner. Other examples include a special-purpose computer, a workstation, a server, a device, a component, or other physical or virtual equipment or some combination thereof capable of responding to and executing instructions.

An example of the host controller 124 is a software application loaded on the host device 122 for commanding and directing communications enabled by the host device 122. Other examples include a program, a piece of code, an instruction, a device, a computer, a computer system, or a combination thereof, for independently or collectively instructing the host device 122 to interact and operate as described. The host controller 124 may be embodied permanently or temporarily in any type of machine, component, physical or virtual equipment, storage medium, or propagated signal capable of providing instructions to the host device 122. The host system 120 provides the client system 105A, 105B or 105C with access through the network 130 to the destination system 140. Examples of the network 130 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line), radio, TV, cable, satellite, and/or any other delivery mechanism for carrying data.

The host system 120 uses communications pathway 152 through the network nodes 131 and 132 to access the destination system 150 for communications with the gaming client system 105A. The host system uses communications pathway 154 through the network nodes 133-135 to access the destination system 150 for communications with the streaming client system 105B, and uses communication pathway 156 through network nodes 133 and 136 to access the destination system 150 for communications with the streaming client system 105C. Each of the communications pathways 152-156 may include, for example, a wired, wireless, cable or satellite communications pathway.

The host system 120 selects the communication pathway 152, 154 or 156 based on the user experience type associated with the access account and stored in account information 132A, 132B or 132C. The host system 120 may use one or more of network traffic management techniques, such as traffic policing, traffic shaping, and fair queueing, to select a particular communication pathway 152, 154 or 156 for a particular client system 105A, 105B or 105C. Typically, the host system 120 applies traffic management technique to each flow, or connection, with the destination system 150 based on the user experience type associated with the home-networking gateway 130A, 130B or 130C, respectively, to which communications from the destination system 150 are sent.

The host system 120 includes account information 146 for each of the client systems 105A, 105B and 105C that is permitted access to the host system 120. The account information 120 may include a user account name or other type of user account identifier, such as the media access control (MAC) address of a home gateway device through which the client system 105A, 105B or 105C accesses the host system 120, the clear-text and/or encrypted password associated with the user account, the name and mailing address of the person responsible for the account, and automatic payment information (such as credit card authorization) for the account. The person responsible for the account may be referred to as the responsible party or billing name. The address of the person responsible for the account also may be referred to as the billing address.

The account information 146 for each client system 105A, 105B or 105C also may include the user experience type that identifies the network resource consumption preference of the user. The user experience type may be one of several types, such as (but not limited to) a browsing user experience type, a streaming user experience type, and a gaming user experience type, as described previously.

The account information 146, for example, may be the account information depicted in the table below. This may be accomplished, for example, by using a table indexed by user account (or otherwise) to look-up the user experience type associated with a particular account. As shown below, the table may identify an account, a password, a name of the responsible party, billing address, and a user experience type associated with a user account.

| User Account | Password | Responsible Party | Billing Address | User Experience Type |
|---|---|---|---|---|
| Smith_Family | 5846%JYNG | William Smith | 56 Robin Lane, Anytown, State 99999 | Gamer |
| John_Jones | 6748#474V | John Jones | 123 Main St. Anytown, State 99999 | Browsing user |
| D_Garcia | JHG7868$0 | David Garcia | 45 North View, Anytown, State 99999 | Streaming user |
| Bristol_Family | 85775$#59 | Betty Bristol | 67 Meadowlark, Anytown, State 99999 | Browsing user |

In some implementations, the account information 146 also may include information related to the consumption of resources by the home-networking gateway 130A, 130B or 130C. The consumption information may be received from the home-networking gateway 130A, 130B or 130C or may be determined by the host system 120. The host system 120 may be configured to offer additional services based on the consumption information. For example, the host system 120 may send an electronic mail message to an account offering to upgrade the user experience type for the account when the consumption information for the account is at a predetermined level. When the consumption of resources by an account is eighty percent of the resource limit for the home-user experience type, an electronic mail message may be sent suggesting the user consider upgrading the user experience type to a business-user experience type.

The host system 120 also includes cost information 148 that identifies the cost for network access for a billing period (such as a month, a quarter, or a year) for each user experience type. For example, the access charge for a gaming user experience type client system, such as client system 105A, may be a particular amount. The access charge for a streaming user experience type, such as client system 105B, may be a different amount and less than the charge for a gaming user experience type. The access charge for a browsing user experience type, such as client system 105C, may be yet another amount and less than the charge for a streaming user experience type. An example list or table of cost information 148 is depicted in the table below.

| User Experience Type | Cost Per Billing Period |
|---|---|
| Gamer | $45.00 |
| Streaming user | $25.00 |
| Browsing user | $15.00 |

The host system 120 may be configured to determine the cost of access for a period for each of the client systems 105A, 105B and 105C based on the user experience type associated with each client system 105A, 105B or 105C and the cost for each user experience type. This may be accomplished, for example, by generating an invoice on a periodic billing cycle (e.g., monthly, quarterly, or annually) for each of the client systems 105A, 105B or 105C. The amount of access charges invoiced for each client system 105A, 105B and 105C depends on the user experience type of the client system

105A, 105B and 105C as identified in account information 146 and the cost information 148 for the corresponding user experience type.

The host system 120 may be configured to generate billing information for each of the client systems 105A, 105B and 105C. For example, the host system 120 may be configured to use the determined cost of access for each client system 105A, 105B and 105C to generate an invoice to be sent to the responsible party for each client system 105A, 105B and 105C. Alternatively or additionally, the host system 120 may be configured to generate and send invoice information to a billing system for additional processing. In some implementations, the host system 120 may be configured to generate billing information for use in charging a credit card or debiting a bank account associated with the account in lieu of sending an invoice to the billing address of each account. In such a case, a statement optionally may be generated, printed and sent to the billing address of an account informing the responsible party of the transaction.

The destination system 150 includes a destination device 152 and a destination controller 154. The destination device 152 and the destination controller each typically include one or more hardware components and/or software components, as described previously with respect to the host device 122 and the host controller 124, both of the host system 120.

In some implementations, the host system 120 may provide access to a different destination system for each of the client systems 105A, 105B and 105C.

Figure 2:
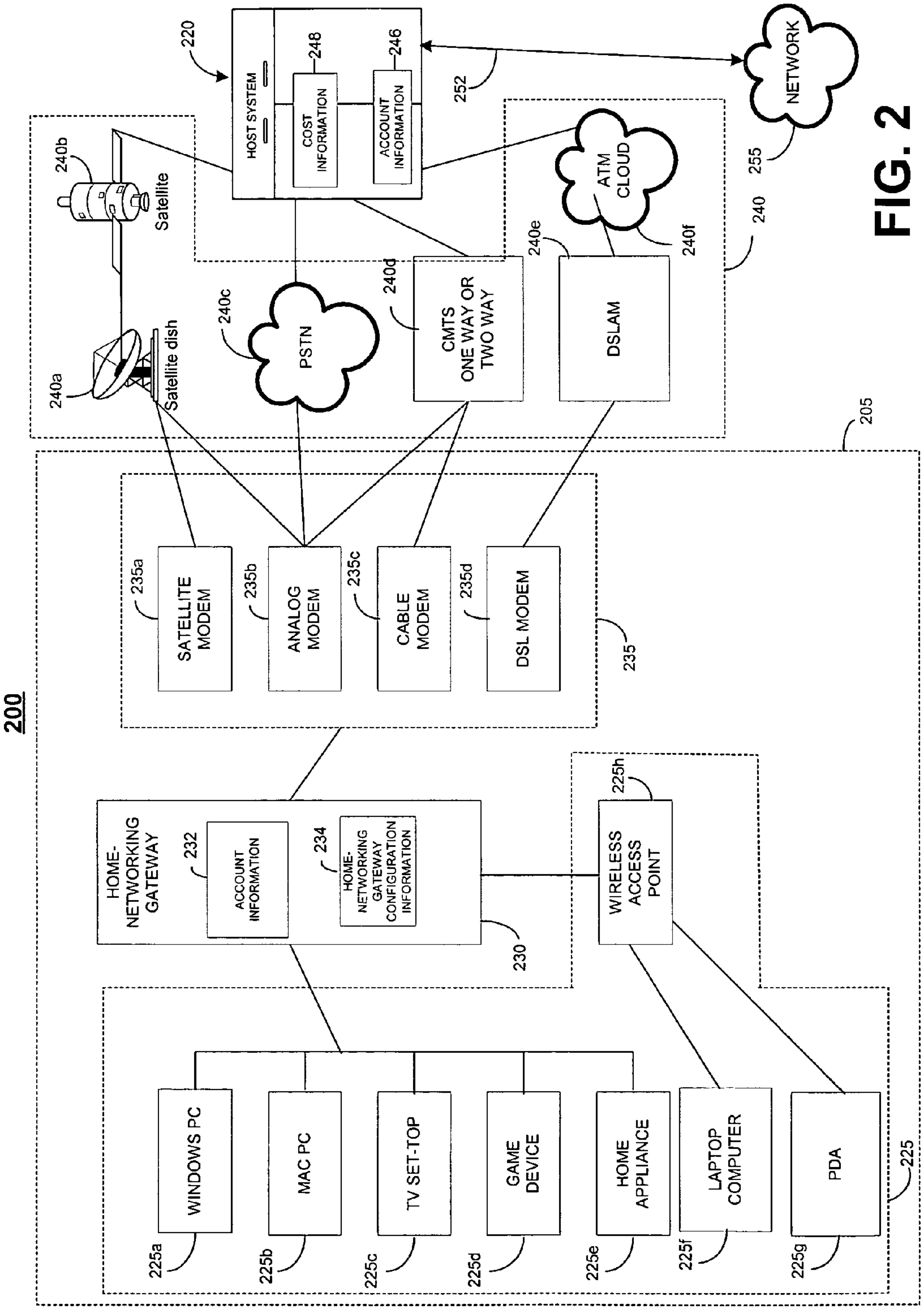
FIGS. 2-4 are block diagrams showing aspects of the exemplary communications system of FIG. 1.

FIG. 2 shows a communications system 200 that includes a client system 205 (which may be an implementation of client system 105A, 105B or 105C, all of FIG. 1) having multiple home-networked devices 225 ("devices") connected to each other and to a home-networking gateway 230. The communications system 200 enables the devices 225 to communicate with the host system 220 using a communications device 235 of the home-networking gateway 230.

The devices 225, the home-networking gateway 230, and the communications devices 230 and 235 may be included in a client system 205 physically located in a personal residence (e.g., a single-family dwelling, a house, a townhouse, an apartment, or a condominium). However, the location of the home-networking gateway 230 in the personal residence does not necessarily preclude one or more of the devices 225 from being networked to the home-networking gateway 230 from a remote location. Similarly, the location of the home-networking gateway in the personal residence does not necessarily preclude use of one or more of the devices 225 from outside of the personal residence or communication by those devices with the host system 220 through the home-networking gateway 230. For instance, the devices 225 may include one or more portable computing devices that may be taken outside of the personal residence and still remain connected through a wireless access point to the home-networking gateway 230 located within the personal residence.

The home-networking gateway 230 is located logically between the devices 225 and a host system 220 that is external to the client system 205. The host system 220 may be, for example, an Internet access provider device, an Internet service provider device, an online system proxy server, or another external system device. When the host system is an Internet access provider device, an Internet service provider device, an online system proxy server, the host system may be referred to as a network access provider system.

The devices 225 may include one or more general-purpose computers (e.g., personal computers), one or more special-purpose computers (e.g., devices specifically programmed to communicate with the home-networking gateway 230 and/or the host system 220), or a combination of one or more general-purpose computers and one or more special-purpose computers. Other examples of devices 225 include a workstation, a server, an appliance (e.g., a refrigerator, a microwave, and an oven), an intelligent household device (e.g., a thermostat, a security system, a heating, ventilation and air conditioning (HVAC) system, and a stereo system), a device, a component, other physical or virtual equipment, or some combination of these elements capable of responding to and executing instructions within the system architecture.

As illustrated by FIG. 2, examples of devices 225 may include, but are not limited to, a personal computer with a Windows™ OS 225*a*, a Macintosh™ personal computer 225*b*, a TV set-top box 225*c*, a game device 225*d*, a home appliance 225*e*, a laptop or otherwise portable computer 225*f*, a personal digital assistant (PDA) 225*g*, and a wireless access point (WAP) 225*h*. Some of the devices, such as a personal computer with Windows™ OS 225*a*, a Macintosh™ personal computer 225*b*, a TV set-top box 225*c*, a game device 225*d*, and a home appliance 225*e*, typically communicate with the home-networking gateway 230 through a wired network.

Some of the other devices, such as a laptop computer 225*f* and a PDA 225*g*, typically communicate with the home-networking gateway 130 using the wireless access point 225*h*. When a device communicates using wireless access point 225*h*, the device may be referred to as a wireless device. Wireless devices may include, but may not be limited to portable devices. For example, a desktop personal computer, such as a personal computer with a Windows™ OS 225*a* or a Macintosh™ personal computer 225*b*, may communicate using wireless access point 225*h*. Typically, the wireless access point 225*h* is connected to home-networking gateway 230 through the wired network, such that the wireless access point 225*h* transmits to the home-networking gateway 230 communications received over a wireless communications pathway from wireless devices.

A wireless communications pathway may use various protocols to communicate from a wireless device to a wireless access point 225*h*. For example, the wireless communications pathway may use wireless technology based on the Institute of Electrical and Electronics Engineers, Inc. (IEEE) 802.11 standard (such as 802.11b or 802.11a). The wireless communications pathway also may use wireless technology based on the Bluetooth approach for short range wireless communications, other personal area network (PAN) technologies, or other wireless technology, such as the HiperLan2 standard by the European Telecommunications Standards Institute (ETSI).

Some of the devices 225, such as personal computer with Windows™ OS 225*a*, Macintosh™ personal computer 225*b*, laptop computer 225*f*, and PDA 225*g*, include software for logging on to the host system 220 using a particular client application that is associated with, or that identifies, the user of the device. Such devices may be referred to as client devices. Other devices, such as home appliance 225*e*, may include software for logging on to host system 220 without identifying an associated user of the device. Yet other devices, such as TV set-top 225*c* and game device 225*d*, may be configured to function either as a client device or a non-client device depending on the function being performed.

The home-networking gateway 230 may include a home gateway device, such as a gateway, a router, or another communication device. The home-networking gateway 230 also may include a digital hub capable of receiving broadcast video signals, receiving communication data (such as through a broadband connection), and distributing the signals and data to devices 225. The home-networking gateway 230 may include another communications device and/or a home entertainment device, such as a stereo system, a radio tuner, a TV tuner, a portable music player, a personal video recorder, and a gaming device.

The home-networking gateway 230 typically connects to the host system 220 using a communications device 235. Examples of the communications device 235 may include (and are not limited to) a satellite modem 235*a*, an analog modem 235*b*, a cable modem 235*c*, and an DSL modem 235*d*. The home-networking gateway 230 uses the communications device 235 to communicate through communications links 240 with the host system 220. The communications links 240 may include various types of communication delivery systems that correspond to the type of communications device 235 being used. For example, if the home-networking gateway 230 includes a satellite modem 235*a*, then the communications from the devices 225 and the home-networking gateway 230 may be delivered to the host system 220 using a satellite dish 240*a* and a satellite 240*b*. The analog modem 235*b* may use one of several communications links 240, such as the satellite dish 235*a* and satellite 235*b*, the Public Switched Telephone Network 240*c* (PSTN) which also may be referred to as the Plain Old Telephone Service or POTS, and the Cable Modem Termination System (CMTS) 240*d*. The cable modem 235*c* typically uses the CMTS 240*d* to deliver and receive communications from the host system 220. The DSL modem 235*d* typically delivers and receives communications with the host system 120 through a Digital Subscriber Line Access Multiplexer (DSLAM) 240*e* and an Asynchronous Transfer Mode (ATM) network 240*f*.

The communications system 200 may use various protocols to communicate between the devices 225 and the home-networking gateway 230 and between the home-networking gateway 230 and the host system 220. For example, a first protocol may be used to communicate between the devices 225 and the home-networking gateway 230, and a second protocol may be used to communicate between the home-networking gateway 230 and the host system 220, where the first protocol and the second protocol may be the same or different protocols. As such, the home-networking gateway 230 may include different hardware and/or software modules to implement different home networking system protocols.

The home-networking gateway 230 may include account information 232, as previously described with respect to account information 146 of FIG. 1.

The home-networking gateway 230 also may include home-networking gateway configuration information 234 that may include identifying information, such as a MAC address, associated with the home-networking gateway 230. The home-networking gateway configuration information 234 also may include device information associated with each device, such as one of devices 225, that may connect to the home-networking gateway 230. The device information may include a device identifier for the device, such as a MAC address, a network address (such as a static IP address associated with the device or a dynamic IP address), or other type of hardware device identifier. The dynamic IP address may be assigned to a device by the home-networking gateway 230 or by some other network device through the Dynamic Host Configuration Protocol (DHCP) or another protocol that enables the dynamic allocation of an IP address to a device on a network.

The device information associated with each device also may include, for example, the type of device (e.g., a client or a non-client device), the class of device (e.g., a gaming device, a personal computer, or a PDA), the type of platform (e.g., the type of hardware, such as a Macintosh™ personal computer, a Windows™-based personal computer, a PDA, a home appliance, or an entertainment device), and/or the operating environment (e.g., the operating system type and/or version).

In addition, the device information may include a user-assigned name. The user-assigned name may be referred to as a familiar name or a nickname. For example, an identifier for a particular game device may be associated with the user-assigned name of "Billy's game device." The device information also may include parental control information or other types of access restrictions that are associated with the device.

The home-networking gateway configuration information 234 may include protocol information necessary to configure the home-networking gateway 230 to communicate with devices 225, such as information describing how to establish communications with one or more of devices 225, how to configure the wireless access point 225*h*, or how to configure wireless devices, such as the laptop computer 225*f* or the PDA 225*g* using the wireless configuration information. Wireless configuration information may include a security key, such as a wired equivalent privacy (WEP) key that may be used to encrypt and decrypt transmitted data, and a wireless network name, such as a service set identifier (SSID) that identifies the particular network. The wireless configuration information may include other configuration information, such as a level of encryption (e.g., 40-bit encryption or 128-bit encryption) associated with a WEP key.

The home-networking gateway configuration information 234 may include a list of devices that are permitted access to the home network. For example, the home-networking gateway configuration information 234 may include a list of MAC addresses that uniquely identify the devices that are permitted access to the home network.

Additionally or alternatively, the home-networking gateway 230 may communicate with devices using only a wireless communications pathway. In other implementations, the home-networking gateway 230 may communicate with devices using only a wired communications pathway.

In some implementations, a communications device 235 may be external to the home-networking gateway 230, as shown in FIG. 2, or may be in addition to the communications device 235 included in the home-networking gateway 230. When a communications device is included in the home-networking gateway, the two devices may be said to be "integrated" (e.g., the home-networking gateway may be said to include an integrated communications device). Similarly, in some implementations, a wireless access point 225*h* may be included in the home-networking gateway 230 in lieu of, or in addition to, wireless access point 225*h* that is external to the home-networking gateway 230, as shown in FIG. 2.

The host system 220 may be configured to control the communications flows from the client system 205 through the network 230 such that the pathway through the network 230 is selected based on the user experience type associated with the home-networking gateway 230. This may be accomplished, for example, through the use of traffic management techniques applied by the host system 220. In one example, the host system 220 accesses the user experience type stored in the account information 246 on the host system 220. Based on the accessed user experience type, the host system 220 may set connection parameters, such as a quality of service level, an average bandwidth level, and a traffic burstiness level, to manage the connection for use by the home-networking gateway 230 through the network 230. The host system 220 applies traffic management techniques, such as traffic policing, traffic shaping, and fair queueing techniques, to manage the data transfer using a particular network pathway through the network 230 to the host system 220.

The host system 220 may be configured to determine and generate billing information for the client system 205 based on the user experience type associated with the client system 205, as described with respect with respect to FIG. 1.

Figure 3:
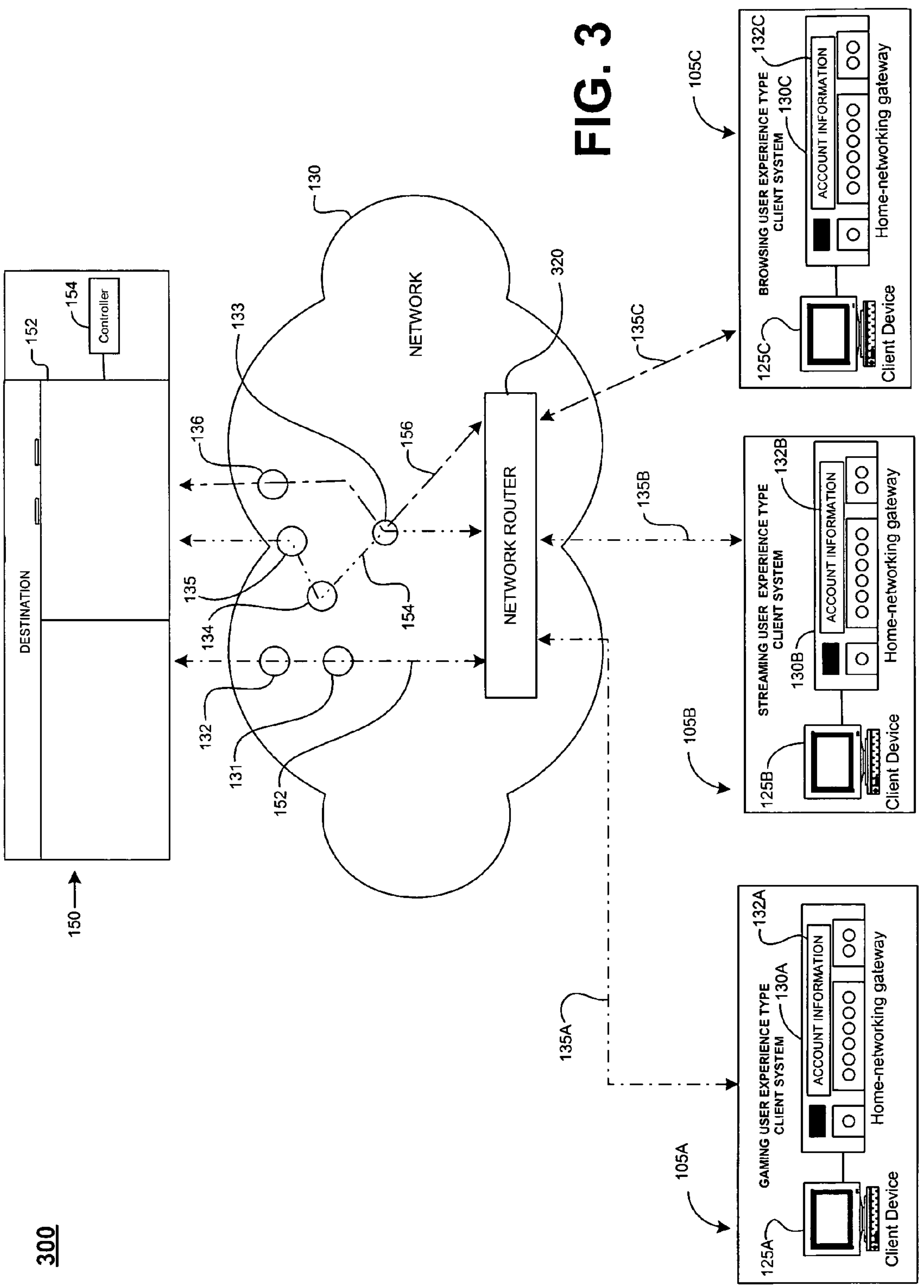

FIG. 3 shows a communications system 300 that includes the client systems 105A, 105B and 105C that communicate over the network 130 with a destination system 150. A network router 320 differentially routes messages over one of communication pathways 152, 154 or 156 between one of the client systems 105A, 105B or 105C and the destination system 150. The network router 320 selects one of the communication pathways 152, 154 or 156 based on a particular user experience defined in the account information 132A, 132B or 132C, respectively, for each of the client systems 105A, 105B or 105C. The network router 320 is located between the destination system 150 and the client systems 105A, 105B and 105C. The network router 320 may be owned or operated by a business entity that provides network access services, such as an Internet service provider or Internet access provider, though the network router 320 is not necessarily owned or operated by a network access provider.

Figure 4:
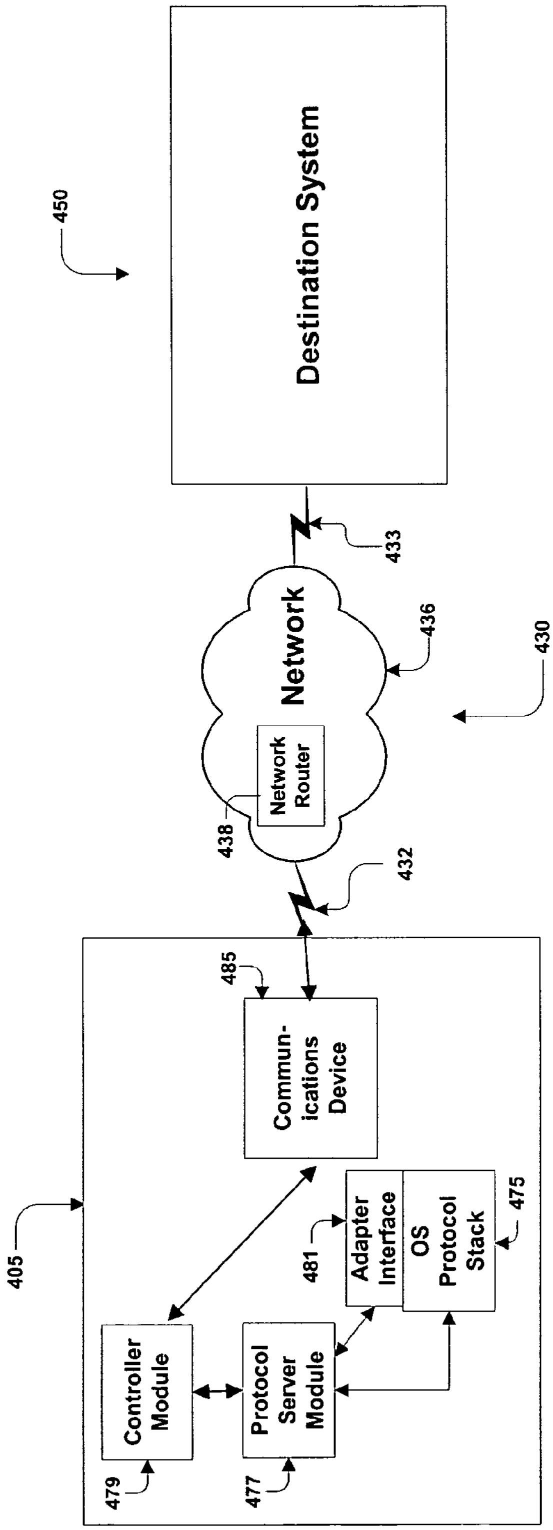

FIG. 4 shows an implementation of a communications system 400 that includes a client system 405, a host system 420, and a communications link 430. The client system 405 may include one or more of an OS protocol stack 475, a protocol server module 477, a controller module 479, an optional adapter interface 481, and a communications device 485. The OS protocol stack 475 may be included as part of an operating system ("OS"). The OS protocol stack 475 may be designed for or capable of enabling the OS to encapsulate data for communication. In general, the OS protocol stack 475 may be implemented using a PPP ("Point-to-Point Protocol") interface. For example, Windows™ OSs generally include a NDISWAN ("Network Device Interface Specification for Wide Area Networks") component that functions as the PPP interface. In some Windows™ OSs and in some other types of OSs, a PPP Daemon (PPPD) may function as the PPP interface.

The protocol server module 477 may be structured and arranged to interface with the client device OS protocol stack 475 and the controller module 479. The protocol server module 477 enables the client system 410 and the host system 420 to communicate through the delivery network 436 using any one of several encapsulating protocols.

The protocol server module 477 may intercept and take over a communications session that the OS protocol stack 475 attempts to initiate with the host system 420 using a first protocol. For example, the OS protocol stack 475 may start a communications session intending to negotiate and exchange configuration data with the host system 420 using the first protocol. Instead, the protocol server module 477 may "spoof" the host system 420 and intercept the communications session from the OS protocol stack 475, rather than having the OS protocol stack 475 communicate directly with the host system 420. The spoofing typically is transparent to the OS protocol stack 475 and the host system 420. By capturing the communications session at the protocol server module 477, the protocol server module 477 may negotiate a separate or a substitute communications session with the host system 420 using a second protocol that is different from the first protocol. Based on this second protocol, data from the OS protocol stack 475 may be routed to the host system 420 over the separate or substitute communications session. Similarly, the protocol server module 477 may be used to spoof the OS protocol stack 475 from the perspective of the host system 420 such that the host system 420 may unknowingly and/or unintentionally transmit to the protocol server module 477 the configuration and/or other data that is destined for the OS protocol stack 475 under the second protocol. The protocol server module 477 then may transport this data to the OS protocol stack 475 using the first protocol.

Data packets that are destined to be communicated between the OS protocol stack 475 and the host system 420 are translated by the protocol server module 477 between the first protocol and the second protocol. For example, when the data packets include encapsulation, the protocol server module 477 may translate the data packets by removing the encapsulation from the data packets. Additionally or alternatively, the protocol server module 477 may translate the data packets by encapsulating previously unencapsulated data packets or re-encapsulating previously encapsulated data packets using any one of several communications protocols.

The protocol server module 477 may interface directly with the OS protocol stack 475, or the client system 405 may further include an interface adapter 481 that the protocol server module 477 uses to interface with the OS protocol stack 475. For instance, in some OSs in which the OS protocol stack 475 is implemented using a PPPD, the protocol server module 477 may interface directly with the PPPD without the need for an interface adapter 417. By contrast, in other OSs, such as the Windows™ OS, in which the OS protocol stack 475 is implemented using NDISWAN, the adapter interface 481 may be used to interface the protocol server module 477 and the NDISWAN protocol stack. More specifically, for example, a WAN ("Wide Area Network") Miniport adapter 481 may be used as a virtual modem to interface the protocol server module 477 and the NDISWAN.

In one implementation, the protocol server module 477 may include a PPP ("Point-to-Point Protocol") server module. When the protocol server module 477 functions as a PPP server module, it may capture a PPP communications session between the OS protocol stack 475 and the host system 420. The PPP server module also negotiates a PPP communications session with the OS protocol stack 475. The PPP server module may translate PPP data packets from the OS protocol stack 475 destined for the host system 420. For example, the protocol server module 477 may translate the data packets by removing the PPP encapsulation. The data packets may include data packets in a format consistent with, for example, Internet Protocol (IP) data, Transmission Control Protocol (TCP) data, other data capable of being encapsulated by an encapsulating protocol, or a combination of these data formats. The data packets may include Layer Three data packets. After removing the PPP encapsulation, the PPP server module may encapsulate the packets in any one of several encapsulating protocols (e.g., PPP, UDP ("User Datagram Protocol"), L2TP ("Layer Two Tunneling Protocol"), and PPP over Ethernet ("PPPoE")). Additionally, the protocol server module 477 may translate data packets from the host system 420 by removing the encapsulation from the data packets and encapsulating the packets in PPP, and then may transport the packets to the client device OS protocol stack 475.

The protocol server module 477 may be configured to enable the client system 405 to communicate with the host system 420 using various encapsulating protocols that are supported by the delivery network 436 and the host system 420, regardless of whether these protocols are otherwise supported by the client system 405. For instance, although a client system 405 may support only a PPP encapsulating protocol through its OS protocol stack 475, the protocol server module 477 may function to enable the client system 405 to communicate through the delivery network 436 with the host system 420 using other encapsulating protocols. In a more specific example, the protocol server module 477 generally enables the client system having only a PPP protocol interface to communicate with the host system 420 using, for example, L2TP, PPP, PPPoE, UDP tunneling, token tunneling (e.g., a P3 tunnel), any other encapsulating protocols and tunneling mechanisms, or a combination of these encapsulating protocols and tunneling mechanisms.

The protocol server module 477 may be implemented as a client application or as a software module within a client application. Examples of client applications include AOL ("America Online") client, a CompuServe client, an AIM ("America Online Instant Messenger") client, an AOL TV ("America Online Television") client, and an ISP ("Internet Service Provider") client capable of communicating with other computer users, accessing various computer resources, and viewing, creating, or otherwise manipulating electronic content). The encapsulation may be performed by the protocol server module 477, or alternatively, it may be performed by a separate client application (e.g., PPP client, UDP client, PPPoE client, L2TP client, or AOL client).

The controller module 479 may be logically connected to the protocol server module 477 and may be structured and arranged to control communications between the OS protocol stack 475, the protocol server module 477, and the host system 420. The controller module 479 may be implemented as a client application or as a software module within a client. Additionally, the controller module 479 may function to control the communications device 485.

The communications device 485 typically has the attributes of and includes one or more of the communications devices described above with respect to communications device 235 of FIG. 2.

The communications link 430 may include communications pathways 432, 434 that enable communications through the one or more delivery networks 436 having a network router 438, such as the network router 320 of FIG. 3. The delivery network 436 that provides a direct or an indirect communications path between the client system 405 and the host system 420, irrespective of physical separation. Examples of a delivery network 436 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line), radio, TV, cable, satellite, and/or any other delivery mechanism for carrying data. Each of the communications pathways 432 and 434 may include, for example, a wired, wireless, cable or satellite communications pathway.

Figure 5:
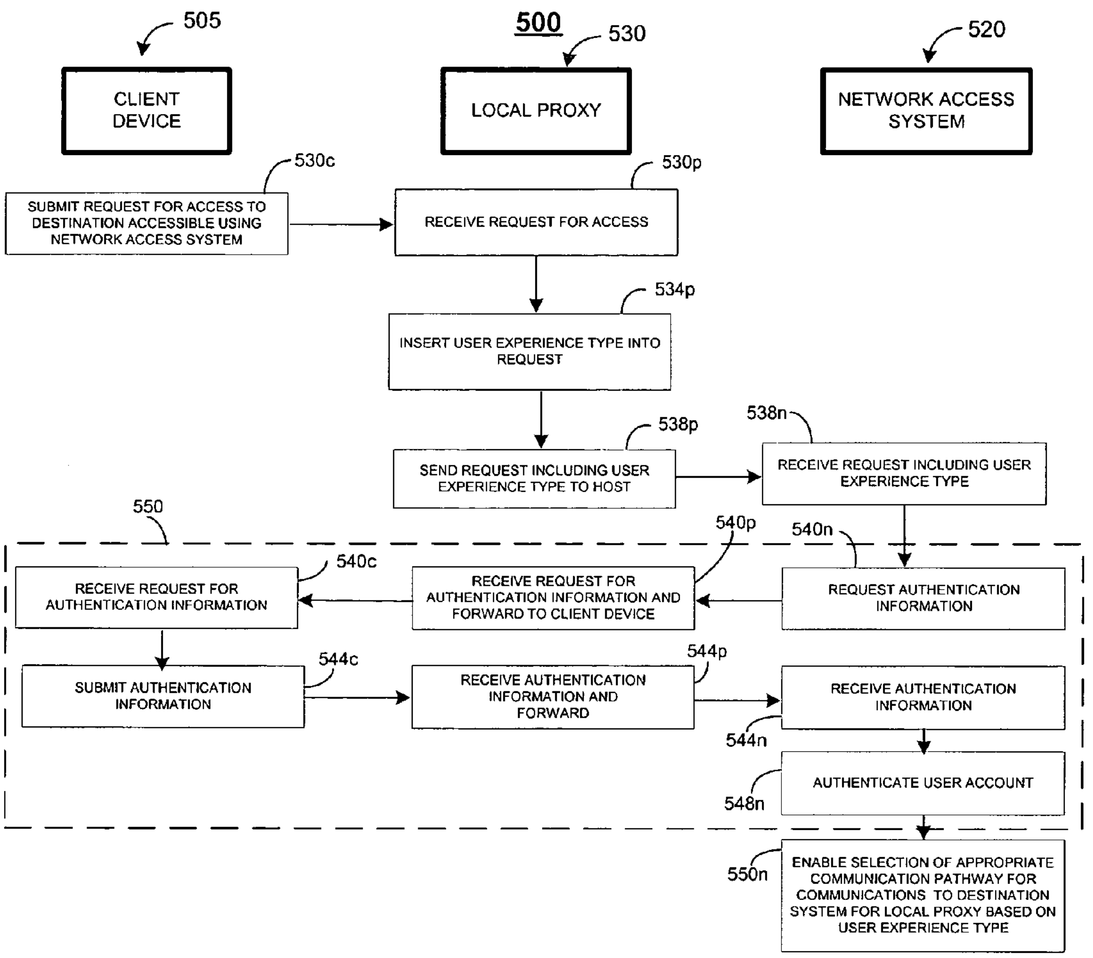
FIG. 5 is a block diagram depicting exemplary communications between a client device, a local proxy, and a network access system to provide tiered access to a computer network.

FIG. 5 shows exemplary communications between a client device 505, a local proxy 530, and a network access system 520 to provide tiered access to a computer network. Using process 500, the local proxy 530 selects a particular communication pathway through the communications network used by the local proxy 530 to access a destination system.

A client device 505 is a device capable of communicating through the local proxy 530 to a network access system 520 through a user account. The client device 505 may be, for example, one of the client devices previously described. The client device 505 communicates with the local proxy 530.

The local proxy 530 may be, for example, an implementation of the home-networking gateway previously described or a protocol server module described in FIG. 4. In some implementations, some or all of the functions described as being performed by the local proxy 530 may be performed by the client device 505. The local proxy 530 communicates with the network access system 520.

The network access system 520 may be an implementation of a host system including an Internet access provider device, an Internet service provider device, an online system proxy server, or another external system device, as previously described. In some implementations, some or all of the functions described as being performed by the network access system 520 may be performed by a network device, such as a network router that is located between the local proxy 530 and the destination system.

The process 500 begins when the client device 505 submits to the local proxy 530 a request for access to a destination system accessible through the network access system 520 (step 530*c*). In some cases, a request for access to the network access system 520 may be additionally included in the access request. This may be particularly true when the network access system 520 is a host system of an Internet service provider or an Internet access provider. In such a case, a separate request to access the access network system 520 also may be received. The local proxy 530 receives the request for access (step 530*p*). The local proxy 530 inserts into the request (or otherwise associates with the request) a user experience type associated with the client device 505, the local proxy 530 or an identity using the client device 505 (step 534*p*). The user experience type is accessible to the local proxy 530, as previously described. Additionally or alternatively, in some implementations, the client device 505 may submit a user experience type with the request to access in step 530*c*. The local proxy 530 sends the request with the inserted user experience type to the network access system 520 (step 538*p*).

In some implementations, the local proxy may send identifying information along with the request. The identifying information may include a MAC address and/or a network address that may uniquely identify a local proxy 530. The identifying information also may include information that identifies the client device 505 from which the access request was sent. For example, the identifying information may include the MAC address of the client device 505.

The network access system 520 receives the request for access with the user experience type (step 538*n*).

When the user account has not yet been authenticated for the communication session, the network access system 520 requests authentication information (step 540*n*). The local proxy 530 receives the request for authentication information and forwards the request to the client device 505 (step 540*p*).

The client device 505 receives the request for authentication information (step 540*c*) and submits authentication information (step 544*c*). For example, the client device 505 may submit a user name and a password or other authenticating information. The client device 505 may obtain authentication information to submit when a user of the client device 505 enters the authentication information or through the access of authentication information stored on the client system, such as the client system 105A, 105B or 105C of FIG. 1. The local proxy 530 receives the authentication information and forwards the authentication information to the network access system 520 (step 544*p*).

The network access system 520 receives the authentication information (step 544*h*) and authenticates the user account of the client device 505 (step 548*n*). If the network access system 520 determines that the user account associated with the client device 505 is not authenticated, the host system may take any of several actions (not shown), including terminating the session immediately, sending a message to the client device 505, or sending a message to a master, family, supervisory or other type of account associated with the local proxy 530 or the user account being authenticated.

When the network access system 520 determines that the user associated with the client device 505 is an authenticated user, the network access system 520 permits the client device 505 to access the communication network accessible through the network access system 520. The steps 540*n* to 548*n* may be referred to as an authentication sub-process 550.

The network access system 520 enables the selection of an appropriate communication pathway for communications to destination system for local proxy based on user experience type inserted into the request (step 550*n*). For example, the network access system 520 may apply the traffic management information based on the stored user experience type to communications between the local proxy 530 and the requested destination system. Traffic information may be a quality of service level, an average bandwidth level, or a traffic burstiness level for use in managing the connection between the local proxy 530 and the requested destination system. The traffic management information also may be a traffic management application or other type of computer program for use by the network access system or a device located in the communications network between the network access system 520 and the destination system to select a communications pathway through the communications network.

Figure 6:
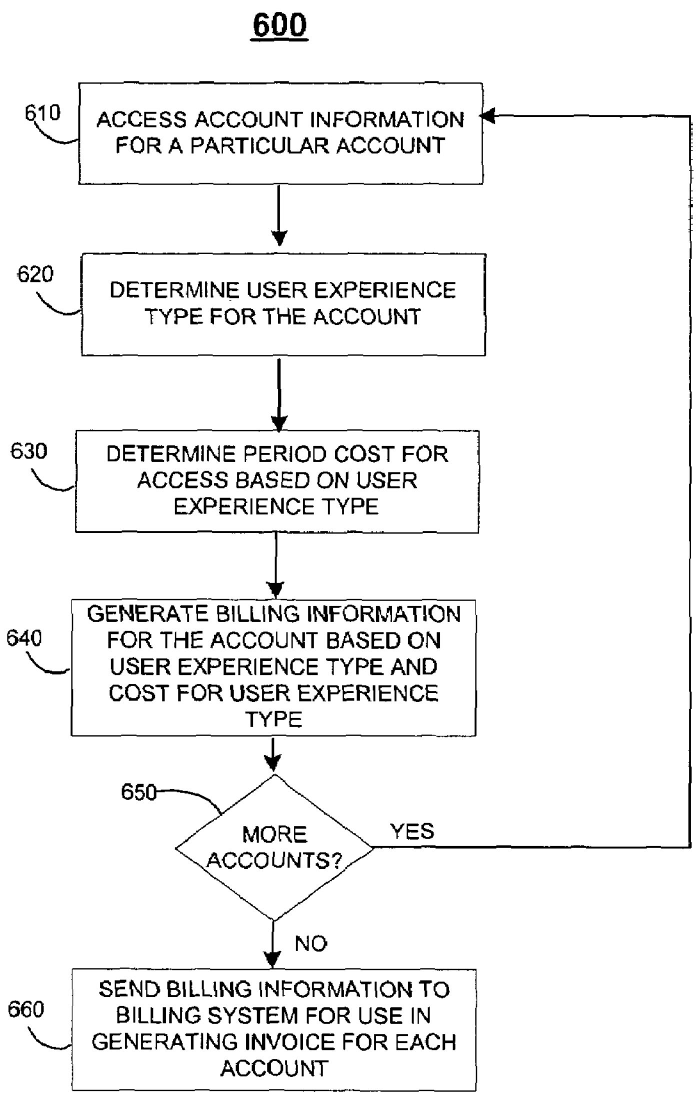
FIG. 6 is a flow chart illustrating a process for the generation of billing information for a user account based on the experience type associated with the user account.

FIG. 6 illustrates a process 600 for the generation of billing information for a user account based on the experience type associated with the user account. The process 600 may be performed by a host system. The process 600 may be performed during a periodic cycle for billing customers for network access. For example, an Internet access or service provider may perform process 600 on a monthly basis to generate an invoice, based on the user experience type of an account, for customer accounts.

The process 600 begins when the host system accesses account information for a particular account (step 610). This may be accomplished, for example, by accessing account information 146 of FIGS. 1 and 2 and processing each account included in account information 146 in sequential order, beginning with the first account accessed.

The host system determines the user experience type associated with the particular account (step 620). For example, the host system may access a user experience type, or an indicator of a user experience type, in account information, such as account information 146 of FIGS. 1 and 2, for the particular account.

The host system determines a cost of access for the billing period based on the user experience type (step 630). This may be accomplished, for example, by accessing cost information, such as cost information 148 of FIGS. 1 and 2, for the user experience type of the account.

The host system generates billing information for the account based on the user experience type and the cost for the user experience type (step 640). For example, the host system may generate a record for the account in a file (or other type of data structure or data container) to be sent to a billing system. Using account information, such as account information 146 of FIGS. 1 and 2, the host system generates a record that includes the user account, the responsible party name, the billing address, and the cost per billing period. The cost included in the billing information is the period cost based on user experience type previously determined.

When additional accounts remain to be processed for the billing period (step 650), the host system continues by accessing another account in step 610 as described previously. When no accounts remain to be processed (step 650), the host system sends to a billing system the billing information generated for the accounts accessed in process 600. For example, the billing system may print the invoices to be mailed to the accounts and track financial payment information for each account. In some implementations, the host system may generate the invoices for each account in addition to, or in lieu of, sending billing information to a billing system. The billing system also may charge a credit card or debit a bank account associated with accounts in lieu of sending an invoice to the billing party or other type of account holder.

Figure 7:
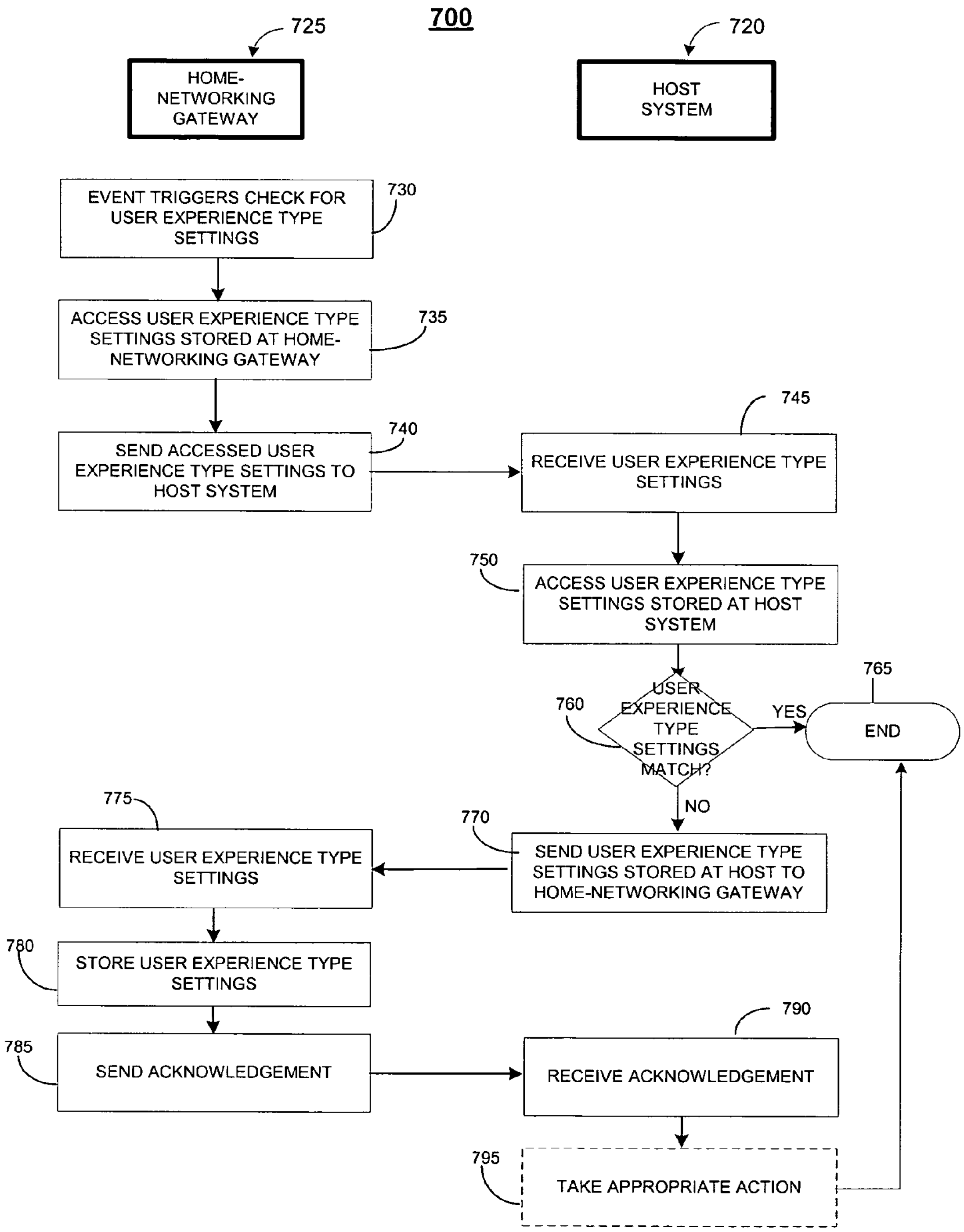
FIG. 7 is a flow chart depicting a process for mirroring user experience type settings on a client system and a host system.

FIG. 7 illustrates a procedure 700 for mirroring user experience type settings on a client system 705 and a host system 720, as previously described. The procedure 700 may be used when user experience type settings are stored on a home-networking gateway and on a host system. The mirroring of host-based user experience type settings on the home-networking gateway allows a comparison between the user experience type settings on the host system and the locally-stored user experience type settings, which may help detect when local user experience type settings have been improperly modified or accessed.

User experience type settings may include, for example, the user experience type, such as described previously with respect to FIG. 5. A home-networking gateway 725 communicates with the host system 720 to mirror (or otherwise redundantly copy and/or compare) user experience type settings.

The procedure 700 begins when an event triggers a check for user experience type settings at the home-networking gateway 725 (step 730). Such an event, may include, for example, when the home-networking gateway 725 establishes a new connection to the host system 720, when a new user of a device logs into the host system 720, when a designated user triggers a user experience type setting check, when a predetermined amount of time has passed since the last time a user experience type setting check was performed, or when a predetermined number of logons has occurred since the last time a user experience type setting check was performed. Alternatively or additionally, whether a check for user experience type settings is appropriate and/or useful and should be triggered may be determined by the home-networking gateway 725, the host system 720, or another computing device. For example, decision logic that identifies the conditions under which user experience type settings should be checked may be executed by the home-networking gateway 725.

The home-networking gateway 725 accesses user experience type settings stored at the home-networking gateway 725 (step 735). In some cases, the user experience type settings may be stored on a storage device that is peripheral to the home-networking gateway 725, such as a peripheral storage device (including a drive, a microdrive, a compact disk (CD), a CD-recordable (CD-R), a CD-rewriteable (CD-RW), flash memory, or a solid-state floppy disk card (SSFDC)).

The home-networking gateway 725 sends the accessed user experience type settings to the host system 720 (step 740). In addition or as an alternative to the user experience type settings themselves, some implementations may send a checksum that is a number representing the user experience type settings transferred from the home-networking gateway 725 to the host system 720.

The host system 720 receives the user experience type settings (step 745) and accesses user experience type settings stored at the host system 720 and associated with the home-networking gateway 725 (step 750). The host system 720 compares the user experience type settings stored at the host system 720 with the user experience type settings received from the home-networking gateway 725 (step 760). To do so, the host system 720 may transform the user experience type settings into a checksum using the same procedure used by the home-networking gateway 725 to compute the checksum. When the user experience type settings (either the user experience type settings themselves or the computed checksums that represent the user experience type settings on the home-networking gateway 725 and host system 720 respectively) match, the procedure 700 ends (step 765).

Alternatively, when the user experience type settings sent by the home-networking gateway 725 and accessed by the host system 720 do not match (step 760), the host system 720 sends the correct user experience type settings to the home-networking gateway 725 (step 770). The home-networking gateway 725 receives the user experience type settings (step 775), stores the user experience type settings (step 780), and sends an acknowledgement message to the host system 720 (step 785). The host system 720 receives the acknowledgement message (step 790).

Additionally or alternatively, when the user experience type settings sent by the home-networking gateway 725 and accessed by the host system 720 do not match (step 760), the host system 720 may take other appropriate action (step 795). Such action may include, for example, notifying the account holder by sending an electronic mail message or an instant message and terminating access to the host system 720.

The techniques and concepts are applicable to communications devices other than a gateway or a home-networking gateway. For example, a router, a digital hub, a general-purpose computer, or a single-purpose configuration management device may perform the functions described as being performed by the gateway. The gateway also may be referred to as a home-networking gateway device.

Implementations may include a method or process, an apparatus or system, or computer software on a computer medium. It will be understood that various modifications may be made that still fall within the following claims. For example, advantageous results still could be achieved if steps of the disclosed techniques were performed in a different order and/or if components in the disclosed systems were combined in a different manner and/or replaced or supplemented by other components.

What is claimed is:

1. A method for validating user experience type settings, the method comprising:

accessing information relating to a first set of user experience type settings that is stored locally on a first device, the first set of user experience type settings defining a first set of parameters for servicing network traffic that involves a computing device and that is transmitted through a second device that is physically distinct and remote from the first device;

receiving information relating to a second set of user experience type settings that is stored on the second device that is physically distinct and remote from the first device, the second set of user experience type settings defining a second set of parameters for servicing network traffic that involves the computing device and that is transmitted through the second device that is physically distinct and remote from the first device;

comparing, using at least one processor, the information relating to the first set of user experience type settings that is stored on the first device with the received information relating to the second set of user experience type settings that is stored on the second device;

determining, based on results of comparing the information relating to the first set of user experience type settings that is stored on the first device with the received information relating to the second set of user experience type settings that is stored on the second device, that the information relating to the first set of user experience type settings that is stored on the first device does not match the received information relating to the second set of user experience type settings that is stored on the second device;

as a consequence of having determined that the information relating to the first set of user experience type settings that is stored on the first device does not match the received information relating to the second set of user experience type settings that is stored on the second device, transmitting from the first device, the first set of user experience type settings to the second device that is physically distinct and remote from the first device to enable the second device to update the second set of user experience type settings that is stored on the second device to match the first set of user experience type settings that is stored on the first device;

receiving, at the first device and from the second device, a communication that originated from the computing device, that is intended for a destination system, and that includes the updated second set of user experience type settings; and as a consequence of the inclusion of the updated second set of user experience settings within the communication received from the second device, regulating transmission of at least a portion of the received communication from the first device to the destination system according to the parameters for servicing network traffic defined in the updated second set of user experience type settings.

2. The method of claim 1 wherein user experience type settings comprise a user experience type from more than one possible user experience types.

3. The method of claim 1 wherein the parameters for servicing network traffic that involves a computing device and that is transmitted through a second device that is physically distinct and remote from the first device include one or more of an average bandwidth limitation, a traffic burstiness limitation, and a quality of service limitation.

4. The method of claim 1 wherein the user experience type settings include checksums computed for the user experience type settings.

5. The method of claim 1 wherein regulating transmission of at least a portion of the received communication from the first device to the destination system according to the parameters for servicing network traffic defined in the updated second set of user experience type settings includes selecting a specific communication pathway from the first device to the destination system through a communication network that has multiple nodes based on the parameters for servicing network traffic defined in the updated second set of user experience type settings.

6. A computer storage medium having embodied thereon a computer program configured to validate user experience type settings, the computer program comprising one or more code segments configured to:

access information relating to a first set of user experience type settings that is stored locally on a first device, the first set of user experience type settings defining a first set of parameters for servicing network traffic that involves a computing device and that is transmitted through a second device that is physically distinct and remote from the first device;

receive information relating to a second set of user experience type settings that is stored on the second device that is physically distinct and remote from the first device, the second set of user experience type settings defining a second set of parameters for servicing network traffic that involves the computing device and that is transmitted through the second device that is physically distinct and remote from the first device;

compare the information relating to the first set of user experience type settings that is stored on the first device with the received information relating to the second set of user experience type settings that is stored on the second device;

determine, based on results of comparing the information relating to the first set of user experience type settings that is stored on the first device with the received information relating to the second set of user experience type settings that is stored on the second device, that the information relating to the first set of user experience type settings that is stored on the first device does not match the received information relating to the second set of user experience type settings that is stored on the second device;

as a consequence of having determined that the information relating to the first set of user experience type settings that is stored on the first device does not match the received information relating to the second set of user experience type settings that is stored on the second device, transmit, from the first device, the first set of user experience type settings to the second device that is physically distinct and remote from the first device to enable the second device to update the second set of user experience type settings that is stored on the second device to match the first set of user experience type settings that is stored on the first device;

receive, at the first device and from the second device, a communication that originated from the computing device, that is intended for a destination system, and that includes the updated second set of user experience type settings; and as a consequence of the inclusion of the updated second set of user experience settings within the communication received from the second device, regulate transmission of at least a portion of the received communication from the first device to the destination system according to the parameters for servicing network traffic defined in the updated second set of user experience type settings.

7. The medium of claim 6 wherein user experience type settings comprise a user experience type from more than one possible user experience types.

8. A system for validating user experience type settings, the system comprising a processor connected to a storage device and one or more input/output devices, wherein the processor is configured to:

access information relating to a first set of user experience type settings that is stored locally on a first device, the first set of user experience type settings defining a first set of parameters for servicing network traffic that involves a computing device and that is transmitted through a second device that is physically distinct and remote from the first device;

receive information relating to a second set of user experience type settings that is stored on the second device that is physically distinct and remote from the first device, the second set of user experience type settings defining a second set of parameters for servicing network traffic that involves the computing device and that is transmitted through the second device that is physically distinct and remote from the first device;

compare the information relating to the first set of user experience type settings that is stored on the first device with the received information relating to the second set of user experience type settings that is stored on the second device;

determine, based on results of comparing the information relating to the first set of user experience type settings that is stored on the first device with the received information relating to the second set of user experience type settings that is stored on the second device, that the information relating to the first set of user experience type settings that is stored on the first device does not match the received information relating to the second set of user experience type settings that is stored on the second device;

as a consequence of having determined that the information relating to the first set of user experience type settings that is stored on the first device does not match the received information relating to the second set of user experience type settings that is stored on the second device, transmit, from the first device, the first set of user experience type settings to the second device that is physically distinct and remote from the first device to enable the second device to update the second set of user experience type settings that is stored on the second device to match the first set of user experience type settings that is stored on the first device;

receive, at the first device and from the second device, a communication that originated from the computing device, that is intended for a destination system, and that includes the updated second set of user experience type settings; and as a consequence of the inclusion of the updated second set of user experience settings within the communication received from the second device, regulate transmission of at least a portion of the received communication from the first device to the destination system according to the parameters for servicing network traffic defined in the updated second set of user experience type settings.

9. The system of claim 8 wherein user experience type settings comprise a user experience type from more than one possible user experience types.

* * * * *